United States Patent

Fleetman

[15] 3,638,117
[45] Jan. 25, 1972

[54] MINIATURE DRUM INDICATOR

[72] Inventor: Hobart H. Fleetman, Perkasie, Pa.

[73] Assignee: Electro-Mechanical Instrument Co., Inc., Perkasie, Pa.

[22] Filed: Mar. 14, 1969

[21] Appl. No.: 807,267

[52] U.S. Cl. ..................324/146, 324/151 R, 340/373
[51] Int. Cl. ..........................G01r 1/20, G01r 1/16
[58] Field of Search ........................324/146, 147, 156, 151; 340/373; 116/116, 57

[56] References Cited

UNITED STATES PATENTS 3,074,060   1/1963   Kadlec ..........................324/146 UX
3,376,569   4/1968   Watkins ..........................340/373 X
3,518,665   6/1970   Bristol ..........................340/373

FOREIGN PATENTS OR APPLICATIONS 7,182,342   11/1964   Germany ..........................324/151

Primary Examiner—Alfred E. Smith
Attorney—Woodcock, Washburn, Kurtz & Mackiewicz

[57] ABSTRACT

In an electrical meter, the indicator includes a drum driven by a moving-magnet-type meter movement. A helical pattern on the drum moves relative to a flat scale to represent the value of an applied electrical signal.

3 Claims, 3 Drawing Figures

PATENTED JAN 25 1972 3,638,117

MINIATURE DRUM INDICATOR

BACKGROUND OF THE INVENTION

This invention relates to electrical meters and more particularly to an electrical meter having a drum-type indicator.

There exists a requirement for an electrical meter having a long flat scale and which can be driven from a low level electrical signal. In particular, this need exists for use with tuners of the voltage tuned type used, for example, in radio and TV sets. In voltage tuners, the air capacitor used in normal tuners is replaced by a variable resistor together with a solid-state voltage sensitive capacitor to obtain the desired tuning. In tuners using variable air capacitors, the mechanical position of the tuning knob is a fairly reliable indication of the frequency to which the tuner is tuned. Hence, tuners of that type merely provide a scale used in relation to the tuning knob to indicate the station tuning.

However, in voltage tuners the position of the tuning knob is not necessarily a reliable indication of tuning, particularly where standard grade variable resistors are used. In voltage tuners, there is, however, a voltage available which is a reliable indication of the station to which it is tuned. It has been proposed to provide a meter-type indicator which is responsive to this voltage to provide an indication of station tuning.

Some of the requirements of such a meter are that be relatively simple, low cost and rugged.

The desired display for such a meter can be met by indicators of the drum type. Such indicators for other purposes are shown in U.S. Pat. Nos. 1,828,053, Kourtzman, and, 2,910,036, Lasko, which show drum-type indicators for speedometers.

Electrical meters with drum-type indicators are shown in the copending application of my coworker, Elbert Kennedy Mackenzie, Ser. No. 807,268, filed Mar. 14, 1969.

SUMMARY OF THE INVENTION

In accordance with an important aspect of the present invention, there is provided an electrical meter having a drum indicator.

The drum has a helical pattern, or a helical stripe around the periphery of the drum. When viewed through a slot having the scale associated therewith, the rotation of the drum in response to the application of an input signal gives the effect of an advancing stripe which moves relative to the scale and provides an indication of the value of the applied input signal.

Accordingly, it is one object of the present invention to provide a flat, straight scale electric meter with a readout which minimizes parallax.

It is another object of the present invention to provide a meter having a rugged, simple construction for commercial and industrial service.

It is another object of the present invention to provide a low cost meter having a construction which is suitable for large quantity production and for low power consumption in service.

It is another object of the present invention to provide a meter which can be easily read by nontechnical users without ambiguity, can be read at a distance and can be read in direct sunlight (an attribute not present, for example, in optical projection meters).

It is another object of the present invention to provide an electrical meter which is compatible with voltage tuning of TV, radios, amplifiers, electronic circuitry and automotive tachometers and which avoids precision potentiometer shaft position indication.

It is another object of the present invention to provide an indicator which is suitable for use with a remote tuner of the variable voltage type.

The foregoing and other objects, features and advantages of the invention will be apparent from the following more detailed description and appended claims.

DESCRIPTION OF A PARTICULAR EMBODIMENT

Figure 1:
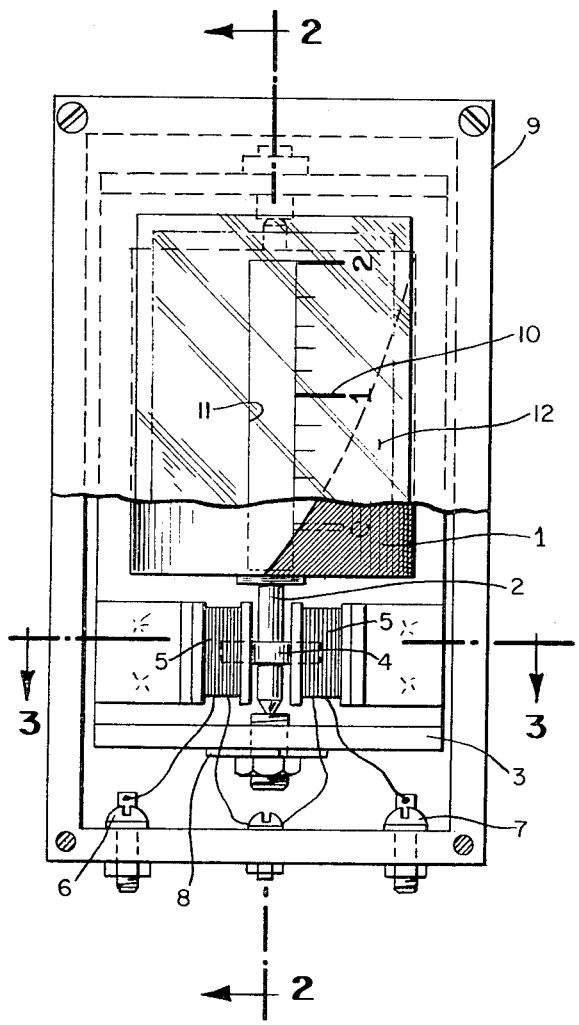
FIG. 1 shows the meter of this invention partially in section.
Figure 2:
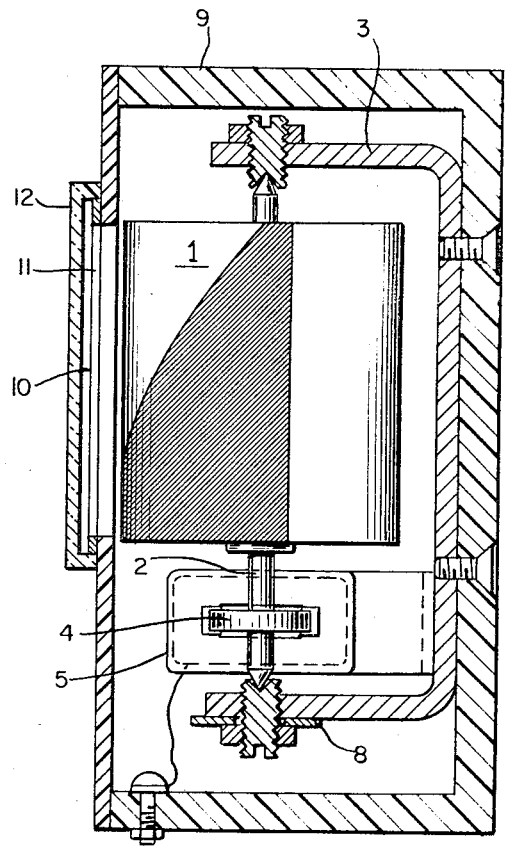
FIG. 2 is a sectional view along the lines 2—2.
Figure 3:
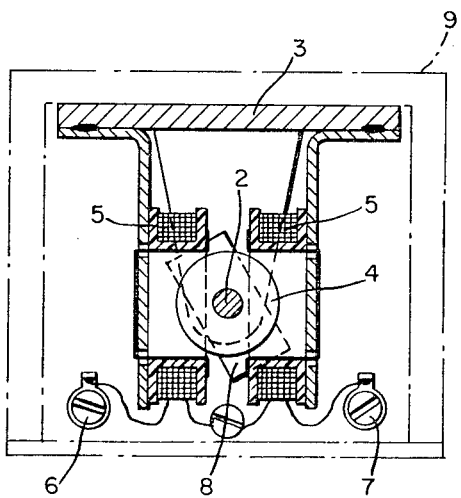
FIG. 3 is a sectional view along the lines 3—3.

Referring now to the drawings, the meter includes the drum 1. The drum has a pattern thereon divided into two colors or shades. The dividing line between the two portions is a helix around the drum. Dividing the periphery of the drum into red and white areas provides a particularly distinctive display.

The drum 1 is mounted on an arbor 2 which is journaled in the frame 3. Mounted on the arbor 2 is the moving magnet armature 4. The armature is disposed within the electrical coil 5. The coil is electrically connected to the terminals 6 and 7. An electrical signal, the magnitude of which is to be displayed, is applied to the terminals 6 and 7.

In order to set the zero of the meter, a rotatable control magnet 8 is provided. This coacts with the armature to adjust the zero position of the drum.

The drum and meter movement are enclosed within the case 9. The case has a scale 10 disposed adjacent the viewing slot 11. The scale is protected by the transparent meter face 12.

In operation, an electrical signal applied to the terminals 6 and 7 results in rotation of the drum 1. As the drum rotates, the helical pattern presents an advancing stripe relative to the scale 10. The position of the stripe relative to the scale presents an easily readable indication of the magnitude of the electrical signal.

As previously discussed, this type of meter is easily adapted for use with a voltage tuner so that the meter provides a good and reliable indication of the frequency to which the tuner is tuned.

While a particular embodiment of the invention has been shown and discussed, it will be understood that various modifications may be made without departing from the true spirit and scope of the invention. The appended claims, therefore, are intended to cover any such modifications.

What is claimed is:

1. An electrical meter for indicating the value of an electrical signal applied thereto comprising:
   a rotatable drum indicator,
   electrical coil means positioned outside said rotatable drum indicator, said electrical signal being applied to said electrical coil means,
   a moving magnet armature disposed inside said coil magnetically coupled to said electrical coil means,
   a shaft, said drum indicator being mounted on said shaft, and
   bearings externally mounted for support of said drum, said shaft being rotatably mounted in said bearings, said drum being mechanically coupled for rotation by said armature to represent the value of said signal in accordance with the relative rotation of said drum.

2. The meter recited in claim 1 wherein said drum has a two-section pattern around the periphery thereof, the dividing line between said two patterns being a helix, and wherein rotation of said drum advances said helix longitudinally of said drum.

3. The meter recited in claim 2 and,
   a case having a viewing slot longitudinal of said drum, said helix presenting an advancing stripe when viewed through said slot as said drum rotates, and
   a scale disposed in relation to said slot to indicate the magnitude of said electrical signal.

* * * * *